United States Patent
Holur (10) Patent No.: US 7,239,861 B2
(45) Date of Patent: Jul. 3, 2007

(54) SYSTEM AND METHOD FOR COMMUNICATION SERVICE PORTABILITY

(75) Inventor: Balaji S. Holur, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 614 days.

(21) Appl. No.: 10/228,671

(22) Filed: Aug. 26, 2002

(65) Prior Publication Data

US 2004/0038689 A1 Feb. 26, 2004

(51) Int. Cl.
*H04Q 7/20* (2006.01)
*H04Q 7/38* (2006.01)

(52) U.S. Cl. ............... 455/405; 455/435.1; 455/435.2; 455/435.3; 455/410; 455/411; 455/466; 455/414.1

(58) Field of Classification Search .. 455/435.1–435.3, 455/422.1, 403, 406–408, 432.1, 432.2, 432.3, 455/433, 414.1, 414.2, 466, 414.4, 550.1, 455/500, 517, 556.1, 556.2, 557, 410, 411, 455/412.1, 412.2

See application file for complete search history.

(56) References Cited

U.S. PATENT DOCUMENTS

| | | | | |
|---|---|---|---|---|
| 6,553,219 | B1 * | 4/2003 | Vilander et al. | 455/411 |
| 7,003,282 | B1 * | 2/2006 | Ekberg | 455/411 |
| 2002/0169966 | A1 * | 11/2002 | Nyman et al. | 713/182 |
| 2003/0041119 | A1 * | 2/2003 | Bisdikian et al. | 709/219 |
| 2004/0139201 | A1 * | 7/2004 | Chaudhary et al. | 709/229 |
| 2005/0009520 | A1 * | 1/2005 | Herrero et al. | 455/435.1 |

FOREIGN PATENT DOCUMENTS

| | | |
|---|---|---|
| EP | 1 045 598 A1 | 10/2000 |
| WO | WO01 22661 * | 3/2001 |
| WO | WO/01 97483 A2 | 12/2001 |

OTHER PUBLICATIONS

Notification of Transmittal of the International Search Report or the Declaration (PCT Rule 44.1) mailed Feb. 3, 2004 (7 pages) re International Application No. PCT/US 03/25579, Filed Aug. 15, 2003.
Perkins, "Mobile IP and Security Issue: An Overview," Proceedings of 1st IEEE-RPS Joint Conference on Internet Technologies and Services, pp. 131-148, Oct. 25, 1999.
Ishikawa et al., "An Architecture for User Authentication of IP Multicast and its Implementation," Internet Workshop, pp. 81-87, Feb. 18, 1999-Feb. 20, 1999.
Mun Gi Choi et al., A New Multimedia Network Architecture Using 3G CDMA2000, vol. 6, pp. 2937-2944, Sep. 24, 2000.

* cited by examiner

*Primary Examiner*—Keith Ferguson
(74) *Attorney, Agent, or Firm*—Baker Botts L.L.P.

(57) ABSTRACT

A system and method for communication service portability include the ability to receive, at an access point, a registration request for a user of an endpoint and to generate, based on the received registration request, a registration request for a wireless network authorization module, the generated registration request containing information from a user information module. The system and method also include the ability to receive a response to the generated registration request, to determine whether the generated registration request has been accepted, and to generate a response to the received registration request based on the status of the received response.

25 Claims, 4 Drawing Sheets

FIG. 1

SYSTEM AND METHOD FOR COMMUNICATION SERVICE PORTABILITY

BACKGROUND OF THE INVENTION

Modern communication systems allow individuals to stay in communication as they move about. The most widespread and popular device for this is the cellular telephone, which allows people to communicate verbally with each other. Unfortunately, cellular telephones are associated with specific users. Thus, different people cannot use the same cellular telephone and all be associated distinctly with it, which would aid in billing and placement of calls to and/or from the cellular telephone.

There also exist a variety of other communication devices to which people need access as they move about, such as voice over Internet protocol devices in enterprises. These devices typically suffer from the same drawback previously discussed for the cellular telephones—the inability for different people to use the same telephone and be distinctly associated with the telephone.

SUMMARY OF THE INVENTION

The present invention provides a system and method for allowing a user of communication devices in a wireless telephone network and/or an enterprise network to have the devices be distinctly associated with the user. To accomplish this, the present invention, at least in particular embodiments, allows the service provider to provide the ability for the user to operate across disjoint networks.

In certain embodiments, a method for communication service portability includes receiving, at an access point, a registration request for a user of an endpoint and generating, based on the received registration request, a registration request for a wireless network authorization module, the generated registration request containing information from a user information module. The method also includes receiving a response to the generated registration request, determining whether the generated registration request has been accepted, and generating a response to the received registration request based on the status of the received response.

In particular embodiments, a system for communication service portability includes an access point. The access point is operable to receive a registration request for a user of an endpoint and to generate, based on the received registration request, a registration request for a wireless network authorization module, the generated registration request containing information from a user information module. The access point is further operable to receive a response to the generated registration request, to determine whether the generated registration request has been accepted, and to generate a response to the received registration request based on the status of the received response.

In some embodiments, a method for communication service portability includes receiving, at a wireless network authorization module, a registration request for a user of a wireless unit and determining whether the user of the wireless unit is authorized. The method also includes receiving, at the wireless network authorization module, a registration request for a user of an endpoint and determining whether the user of the endpoint is authorized.

The present invention has several technical features. For example, in certain embodiments, a user information module (UIM) is usable across an enterprise. This allows a user in an IP telephony environment to have different endpoints associated with himself as he moves about the enterprise. Thus, the user may have consistent service at a variety of endpoints across the enterprise. As another example, in some embodiments, a UIM is usable in a wireless network and an enterprise network. This allows a user to have access to service in both networks, which allows the user wider geographic usage and/or service options. Moreover, this may simplify accounting for the user. As an additional example, in certain embodiments, rationed services may be facilitated. As a further example, in some embodiments, the network entities may be reused, which eliminates redundancies and, hence, reduces costs and/or complexity.

Of course, some embodiments may possess none, one, some, or all of these technical features and/or additional technical features. Other technical features will be readily apparent to those skilled in the art from the figures, description, and claims.

BRIEF DESCRIPTION OF THE DRAWINGS

The figures described below provide a more complete understanding of the present invention and its technical features, especially when considered with the following detailed written description.

DETAILED DESCRIPTION OF THE INVENTION

Figure 1:
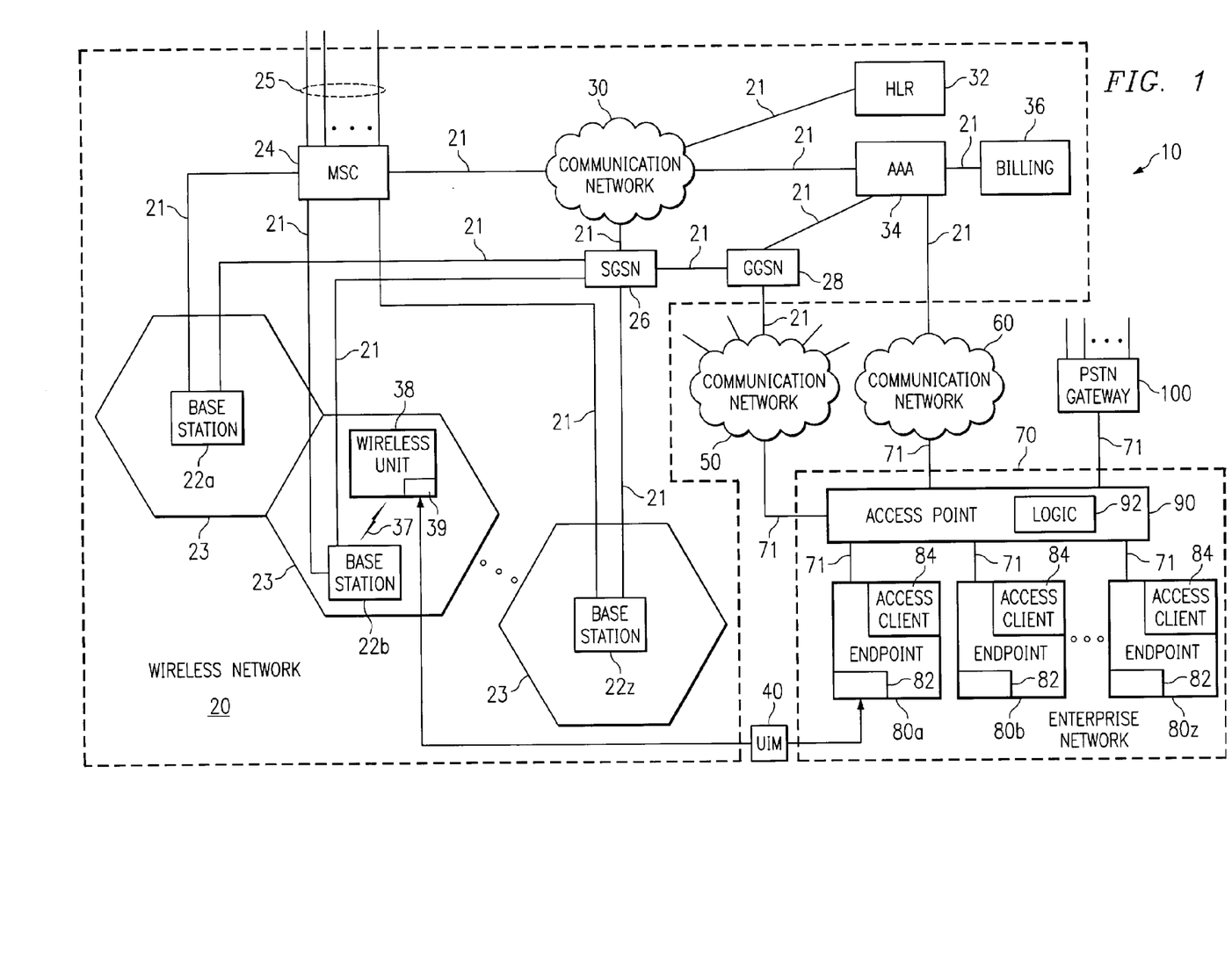
FIG. 1 illustrates a communication system in accordance with one embodiment of the present invention.

FIG. 1 illustrates a communication system 10 in accordance with one embodiment of the present invention. In general, system 10 includes a wireless network 20, a user information module (UIM) 40, a communication network 60, and an enterprise network 70. Wireless network 20, communication network 60, and enterprise network 70 operate together so that a user may use UIM 40 with a communication device of either network to obtain communication service associated with the user.

In more detail, wireless network 20 includes base stations 22, a mobile switching center (MSC) 24, a serving General Packet Radio Service (GPRS) support node (SGSN) 26, a GPRS gateway support node (GGSN) 28, a communication network 30, a home location register (HLR) 32, an administration, authentication, and access (AAA) module 34, and a billing module 36. These components work together to allow wireless units, represented by a wireless unit 38, to send and/or receive data, which could include voice, text, graphics, video, or any other appropriate type of information. Note that not all of the wireless units that operate in wireless network 20 have to be able to work with UIM 40.

Each of base stations 22 has a coverage area 23 and is responsible for wirelessly exchanging data with wireless units within its coverage area. Each of base stations 22 may be composed of a base station controller, a number of base transceiver stations, each responsible for a portion of coverage area 23, and/or any other appropriate components and/or configuration for wirelessly exchanging data with a wireless unit.

Base stations 22 are coupled to MSC 24 and SGSN 26 by links 21, which also couple the other components of network 20. Links 21 may be wires, fiber-optic cables, microwave channels, infrared channels, and/or any other appropriate type of wireline or wireless link. Links 21 may include intermediate servers, routers, switches, repeaters, transceivers, backbones, and/or other appropriate communication devices.

MSC 24 is operable to set up and disconnect calls for wireless units serviced by base stations 22. The calls, which may carry data to and/or from the wireless units, are routed through the public switched telephone network (PSTN) over links 25. MSC 24 is also operable to provide, in conjunction with base stations 22, switch and soft hand-off functionality for network 20. In this way, data may be sent to wireless units that are mobile, as they move between areas 23 of base stations 22. Accordingly, mobile wireless units may travel throughout a wide geographic area while maintaining wireless communications.

SGSN 26 and GGSN 28 also assist in transferring data to and/or from wireless units serviced by base stations 22, although the data is routed through a communication network 50. In general, SGSN 26 is responsible for registering a wireless unit and establishing a communication path for the wireless unit, which could include obtaining an Internet protocol (IP) address and establishing a point-to-point protocol (PPP) link between the wireless unit and GGSN 28. GGSN 28, in turn, is responsible for: 1) receiving data from communication network 50 and destined for a wireless unit serviced by wireless network 20 and sending the data to the appropriate base station 22; and 2) receiving data from a wireless unit serviced by wireless network 20 and sending it to communication network 50. SGSN 26 and GGSN 28 may be routers, servers, switches, or any other type of devices for conveying data to and/or from communication network 50.

Communication network 50 may be composed of servers, routers, switches, repeaters, transceivers, backbones, links, and/or any other appropriate type of communication devices. In general, communication network 50 may be any interconnection found on any communication network, such as a wide area network (WAN), the Internet, or any other data exchange system between two or more computers.

MSC 24 and SGSN 26 are also coupled to communication network 30. Communication network 30 may be composed of servers, routers, switches, repeaters, transceivers, backbones, links, and/or any other appropriate type of communication devices. In general, communication network 30 may be any interconnection found on any communication network, such as a wide area network (WAN), the Internet, or any other data exchange system between two or more computers. In certain embodiments, communication network 30 is an SS7 network.

HLR 32 is also coupled to communication network 30. HLR 32 stores service level agreements for wireless units associated with wireless network 20 and provides the agreements to MSC 24 and SGSN 26 for service management, traffic management, or other appropriate operations. HLR 32 may also store information relating to wireless units and/or users, such as names, addresses, account numbers, account types, and/or any other suitable information.

AAA module 34 is also coupled to communication network 30. AAA module 34 may be a server, a database, a workstation, or any other type of device for storing and logically manipulating information. In operation, AAA module 34 provides authentication, access, and administrative functions to wireless units trying to use wireless network 20.

Billing module 36 is coupled to AAA module 34 and may be a server, a database, a workstation, or any other type of device for storing and logically manipulating information. Billing module 36 is responsible for determining the charges for each wireless unit. Billing module 36 may use criteria such as the time of usage, the area of usage, the place called, the service provided, or any other appropriate metric in determining the charges for a wireless unit and/or user.

Wireless unit 38 wirelessly couples to base stations 22 and is operable to receive data from base stations 22 and/or send data to base stations 22. Wireless unit 38 may be a wireless telephone, a wireless interface terminal, a wireless personal digital assistant, or any other suitable device operable to provide wireless data communication, whether mobile or not. As illustrated, wireless unit 38 is wirelessly coupled to base station 22b over a radio frequency (RF) link 37, although any other suitable wireless link may be used. Wireless unit 38 may communicate data and associated information to base station 22b, MSC 24, SGSN 26, GGSN 28, or other appropriate component of network 20 by in-band and/or out-of-band messaging.

RF link 37 may be any appropriate type of link, such as time division multiple access (TDMA), code division multiple access (CDMA), or frequency division multiple access (FDMA), and may be based on established technology, such as IS-95 CDMA, W-CDMA, or CDMA-2000. In particular embodiments, RF link 37 is a CDMA link based on a CDMA standard in which packets are segmented into frames for wireless transmission from wireless unit 38 to base station 22b, where the frames are reassembled to reconstitute the packets.

Wireless unit 38 contains a port 39 to which UIM 40 may be coupled. Port 39 may be a PCMCIA slot, a PCI slot, a serial interface, a parallel interface, a wireless interface, or any other type of device to which UIM 40 may be coupled for information extraction.

UIM 40 stores information regarding a user in such a manner that wireless unit 38 is able to extract the information for registration of the wireless unit and/or the user, which may include authentication or other appropriate function. For example, UIM 40 may store the user's name, address, authentication key, and/or other appropriate information. UIM 40 may also store information regarding services available to the user and the amount available of a rationed service. In particular embodiments, UIM 40 is a Subscriber Information Module.

In operation, after wireless unit 38 detects UIM 40 and the desire to place a call, wireless unit 38 generates a registration request for the user of wireless unit 38 and sends it to base station 22b. Note that wireless unit 38 may have already registered with base station 22b, but, if it has not, it may register at this time. Moreover, the registration request for the user may contain information from UIM 40, but, if it does not, base station 22b may request it. Base station 22b may then convey a registration request containing information from UIM 40, possibly the same as the one from wireless unit 38, to MSC 24.

Upon receiving the registration request, MSC 24 determines whether a wireless session may be established for the user, perhaps based on management or bandwidth resources. MSC 24 also attempts to authenticate the user based on the information from UIM 40. To authenticate the user, MSC 24 passes the information from UIM 40 to AAA module 34, which, in conjunction with HLR 32, authenticates the information. If a wireless session may be established, and if the user is authenticated, MSC 24 generates a response indicating acceptance of the registration request and sends it to base station 22b. The call may then be placed through base station 22b and MSC 24.

If, however, wireless unit 38 desires a data service, which may, for example, be triggered by the initiation of an application at the wireless unit, the detection of UIM 40, and/or the activation of the wireless unit, a wireless session registration is initiated between wireless unit 38, base station 22b, SGSN 26, and GGSN 28. To accomplish this, wireless unit 38 generates a registration request for the user of wireless unit 38 and sends it to base station 22b. Note that wireless unit 38 may have already registered with base station 22b, but, if it has not, it may register at this time. Moreover, the registration request may contain information from UIM 40, but, if it does not, base station 22b may request it. Base station 22b may then convey a registration request containing information from UIM 40, possibly the same as the one from wireless unit 38, to SGSN 26.

Upon receiving the registration request, SGSN 26 determines whether a wireless session may be established for the user, possibly based on the availability of resources for managing a wireless session, the amount of bandwidth required for the data service, or any other appropriate factor. SGSN 26 also attempts, possibly in conjunction with MSC 24, AAA module 34, and/or HLR 32 to authenticate wireless unit 38. If a wireless session may be established with the wireless unit, and if the user is authenticated, SGSN 26 generates a response indicating acceptance of the registration request and sends it to base station 22b. The data service may then be established.

Establishing a wireless session may also involve allocating RF resources between wireless unit 38 and base station 22b, establishing a radio packet (RP) session between the base station 22b and GGSN 28, establishing a data link between wireless unit 38 and GGSN 28, allocating an Internet protocol (IP) address to wireless unit 38, and/or any other appropriate function.

Establishing the data link may include negotiation, validation, privilege determination, and/or profile determination. For example, establishing a data link may involve base station 22b sending an identifier for wireless unit 38, an identifier for a user of the wireless unit, an identifier for base station 22b, an indication of the data service requested, and/or any other appropriate data to the SGSN 26. Using this data, SGSN 26, possibly in conjunction with MSC 24, AAA server 34, and/or HLR 32, may validate the wireless unit, the subscriber, and/or the data service request. Upon validation, the data link between GGSN 28 and base station 22 may be negotiated. In particular embodiments, the data link may be serial link, such as, for example, a point-to-point protocol (PPP) link between GGSN 28 and wireless unit 38. Once the data link is established, wireless unit 38 may begin receiving and/or sending data.

Assuming that wireless unit 38 has a data link to GGSN 28 through base station 22b, if wireless unit 38 moves into area 23 of another one of base stations 22, SGSN 26 recognizes that wireless unit 38 is communicating with a different one of base stations 22 by receiving a registration request from the base station serving that area. For example, if wireless unit 38 moves into area 23 of base station 22a, base station 22a detects the presence of wireless unit 38, generates a wireless registration request for wireless unit 38, and sends this request to SGSN 26. The registration request may include an identifier for the wireless unit, an identifier for the base station, and/or any other appropriate type of data.

Upon receiving the wireless registration request, SGSN 26 determines whether the registration request is associated with an active wireless session. SGSN 26 may make this determination in particular embodiments by examining a mobility event indicator (MEI) in the registration request, although any other appropriate type of indicator or technique may be used in other embodiments. Note that if the registration request indicates that there is no wireless session associated with the registration request, SGSN 26 may treat the registration request as a request to initiate a wireless session for the wireless unit.

If SGSN 26 determines that the registration request is associated with an active wireless session, GGSN 28 may update the data link information for the wireless session and continue managing the wireless session. Accordingly, the data link may be maintained between GGSN 28 and wireless unit 38.

Enterprise network 70 includes a number of endpoints 80 and an access point 90, which are coupled together by links 71. Enterprise network 70 may be for an entire enterprise or part of an enterprise, such as a branch or home office. Enterprise network 70 may use voice over IP or any other form of packet telephony.

Endpoints 80 allow a user to communicate data to other endpoints 80, to the PSTN, and/or to communication network 50. Endpoints 80 may be telephones, personal computers, personal digital assistants, or any other type of device for conveying data to and/or from a user. Each of endpoints 80 includes a port 82 to which UIM 40 may be coupled. Port 82 may be a PCMCIA slot, a PCI slot, a serial interface, a parallel interface, a wireless interface, or any other type of device to which UIM 40 may be coupled for information extraction. Note that not all of the endpoints of enterprise network 70 have to be able to interface with UIM 40. Endpoints 84 also include an access client 84, which could be logical instructions encoded in an appropriate form of computer-readable media. Access client 84 is operable to register the associated endpoint 80 with access point 90.

Access point 90 provides access, authentication, and/or communication path set up functionality for endpoints 80. To accomplish these functions, access point 90 includes logical instructions 92, which could be encoded in an appropriate form of computer-readable media. Access point 90 may be a call manager, a router, a proxy, or any other appropriate device. Furthermore, access point 90 may implement any of a variety of protocols for communicating with endpoints 80 to establish and maintain communication service, such as, for example, Session Initiation Protocol (SIP), Skinny Protocol, or IEEE 802.11B. Access point 90 is also coupled to communication network 50, communication network 60, and a PSTN gateway 100 by links 71. Access point 90 directs communications from endpoints 80 to the appropriate one of the networks.

Communication network 60 may be composed of servers, routers, switches, repeaters, transceivers, backbones, links, and/or any other appropriate type of communication devices. In general, communication network 60 may be any interconnection found on any communication network, such as a WAN, the Internet, or any other data exchange system between two or more computers. In particular embodiments, some or all of communication network 60 may be part of communication network 50.

In operation, after one of endpoints 80 detects UIM 40, it initiates registration of the user. To register the user, the endpoint may generate and send a registration request, which may be in any appropriate protocol, such as, for example, SIP or Skinny. Network 70 may user security features similar to those of network 20 for exchanging messages and/or data.

Before receiving the registration request, the endpoint may or may not have already registered itself with access point 90. If the endpoint has not already registered itself, the registration may be an L2 authentication of access client 84, for example. If the endpoint has already registered itself, the L2 authentication of the endpoint has probably already occurred, and the IP address has probably been allocated. Thus, when UIM 40 is detected, the registration messages from the endpoint may be proxied by access point 90 to AAA module 34.

The registration request may or may not include the user information in UIM 40. If it does not, access point 90 may request the user information, and the endpoint provides information extracted from UIM 40 to access point 90.

Access point 90 may then generate a registration request for AAA module 34 of wireless network 20 to authenticate the user information with AAA module 34. In particular embodiments, the registration request may need to be proxied via another system. In the illustrated embodiment, the Remote Authentication Dial-In User Service (RADIUS) protocol may be used for the generated registration request. In other embodiments, other appropriate protocols may be used. The generated registration request may be sent to AAA server 34 through communication network 60.

Upon receiving the generated registration request, AAA server 34 determines whether the user is valid. In accomplishing this, AAA module 34 may obtain user profile information from HLR 32 and compare the information to the registration request to determine if the user is valid. Alternatively, AAA server 34 may convey the registration request to HLR 32, which may determine if the user valid. AAA module 34 and/or HLR 32 may determine if the user is valid by using any of a variety of well known techniques. AAA module 34 and/or HLR 32 may be updated to include service type and/or users for network 70. In particular embodiments, AAA module 34 and/or HLR 32 may use an authentication key to determine whether the user is valid.

If the user is valid, AAA module 34 generates a favorable response and sends it to access point 90, through communication network 60. If, however, the user is not valid, AAA server 34 generates a negative response and sends it to access point 90 through communication network 60.

Upon receiving the registration response, access point 90, determines whether the generated registration request was accepted or denied and generates and sends an appropriate response to the requesting endpoint. If the generated response indicates that the registration request has been accepted, the requesting endpoint may then establish a communication path to the appropriate communication network and begin sending and/or receiving data. If, however, the generated response indicates that the registration request has not been accepted, the endpoint may indicate to the user that registration has been denied, perhaps giving a reason, attempt to register again, or perform any other appropriate function.

Billing module 36 may keep track of charges for service in enterprise network 70. To accomplish this, access point 90 tracks the usage of the endpoints 80 and conveys the information to billing module 36. Note that billing module 36 may have to be updated with service type and/or users for network 70.

System 10 may also be useful for validating services, such as, for example, rationed services. For example, UIM 40 may store information regarding the type of services available and/or the portion of a service available to the user. Thus, when the user requests such a service, during or after user registration, endpoint 90 may determine whether the service is available to the user. If the information in UIM 40 indicates that the user has access to and/or a sufficient ration of a specific service, the endpoint communicates with AAA module 34, through access point 90, to get confirmation, especially if UIM 40 is a untrusted entity.

The illustrated embodiment of the present invention has several technical features. For example, a user in an IP telephony environment may have different endpoints associated with himself as he moves about the enterprise. Thus, the user may have consistent service at a variety of endpoints across the enterprise. As another example, because UIM 40 is usable in wireless network 20 and the enterprise network 70, the user may have access to service in both networks, which allows wider geographic usage and/or varying service options. Also, this may simplify accounts for users. Additionally, network entities may be reused, which eliminates redundancies. As a further example, the system is able to facilitate rationed services.

Although system 10 illustrates one embodiment of the present invention, other embodiments may have different components and/or a different arrangement of components and/or functions. For example, in certain embodiments, access point 90 may contain access client application 84. In such situations, the L2 authentication of the endpoints may or may not have already occurred before UIM 40 is detected. As another example, as illustrated, system 10 is configured according to GPRS 2.5G and GPRS 3G. However, substituting a protocol data serving node (PDSN) coupled to base stations 22, AAA module 34, and communication network 50 for SGSN 26 and GGSN 28 would allow the system 10 to be configured as a CDMA system. In these embodiments, radio packet (RP) data sessions may be established between base stations 22 and the PDSN. Each RP session provides a logical path for a wireless unit data packet session between one of base stations 22 and the PDSN. In these embodiments, the messaging between wireless units and the PDSN could use All-Registration Requests and All-Registration Replies. In general, therefore, any type of wireless network may be used with the present invention. In certain embodiments, an endpoint may be able to function in both the wireless network and the enterprise network. In some of these embodiments, the endpoints will choose which network to use, based on strength of signal, established service, and billing rate, for example. In some embodiments, some or all of the users may only have access in network 70. In particular embodiments, a wireless unit may initiate registration of the user after detecting the UIM, whether or not the wireless unit is ready to initiate a communication session. In certain embodiments, AAA module 34 and HLR 32 may be part of an authorization module.

Figure 2:
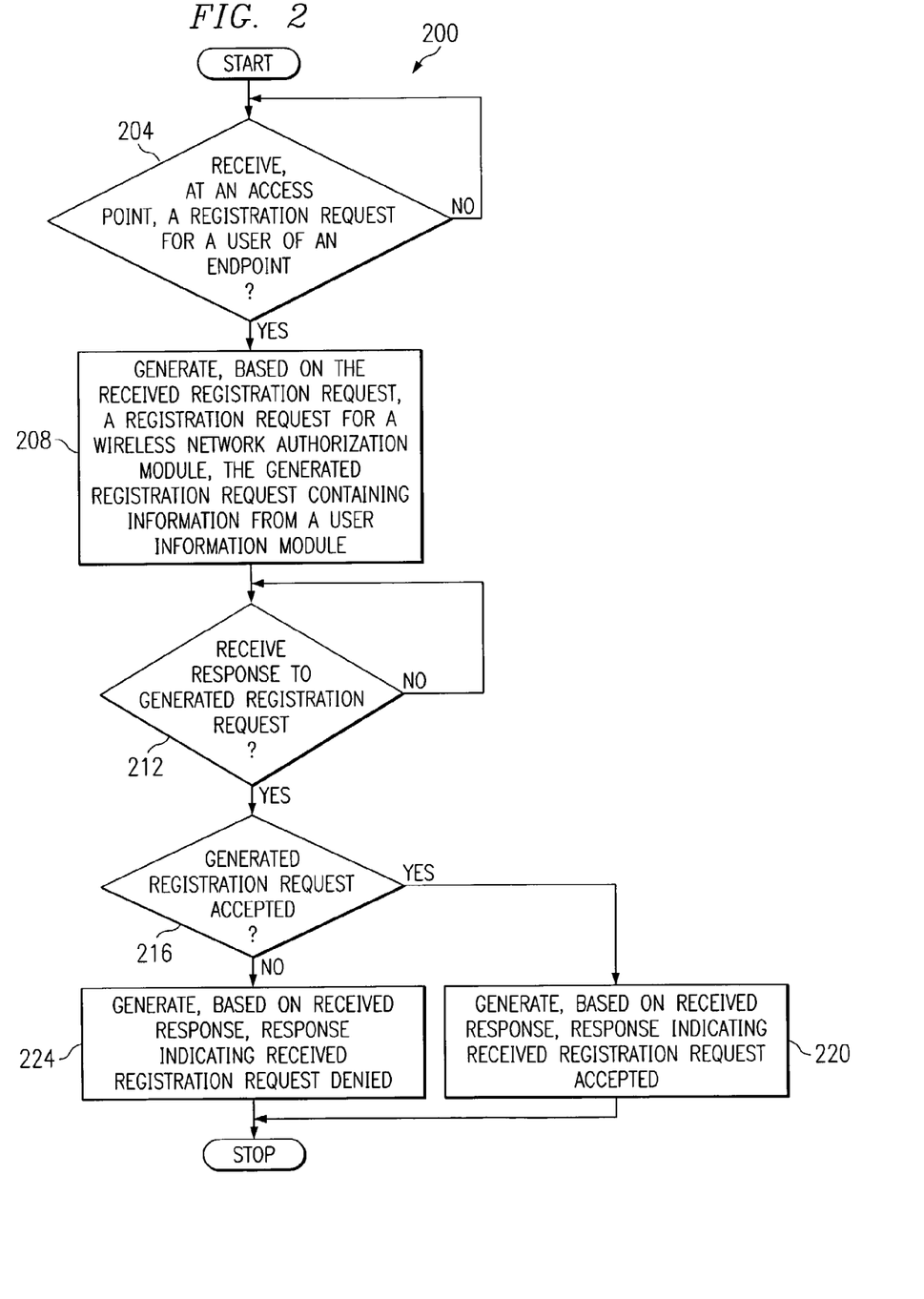
FIG. 2 is a flowchart illustrating a method for communication service portability in accordance with one embodiment of the present invention.

FIG. 2 is a flowchart 200 illustrating a method for communication service portability in accordance with one embodiment of the present invention. The method begins with waiting to receive, at an access point, a registration request for a user of an endpoint at decision block 204. The access point and the endpoint could be similar to access point 90 and endpoint 80a in FIG. 1, for example. The registration request could be a SIP message and could contain user information and/or requested services, for example.

Upon receiving the registration request, the method continues with generating, based on the received registration request, a registration request for a wireless network authorization module, the generated registration request containing information from user information module, at function block 208. The generated registration request may be a RADIUS message, for example, and the wireless authorization module may be similar to AAA module 34 in FIG. 1. The generated registration request may then be sent to the wireless network authorization module.

At decision block 212, the method calls for waiting to receive a response to the generated registration request. Upon receiving the response, which could be a RADIUS message, for example, the method calls for determining whether the generated registration request was accepted at decision block 216. Acceptance of the registration request may reflect the fact that the user is authorized. If the registration request was accepted, the method calls for generating, based on the received response, a response indicating that the received registration request was accepted at function block 220. The generated response may then be sent to the endpoint associated with the received registration request. The generated response may be a SIP message, for example. The method is then at an end.

If, however, the generated registration request was not accepted, the method calls for generating, based on the received response, a response indicating that the received registration request was not accepted at function block 224. The generated response may then be sent to the endpoint associated with the received registration request. The generated response may be a SIP message, for example. The method is then at an end.

Although flowchart 200 illustrates a method for communication service portability in accordance with one embodiment of the present invention, other embodiments may include less, more, and/or a different arrangement of operations. For example, the access point may need to request user information from the endpoint associated with the received registration request. As another example, the access point may not determine whether the received response indicates that the generated registration request was accepted. As an additional example, the access point may establish a session with an endpoint prior to receiving a registration request for a user of the endpoint. As a further example, the access point may facilitate the establishment of a communication path for the endpoint associated with a received registration request that has been accepted. A variety of other examples exist.

Figures 3, 4:
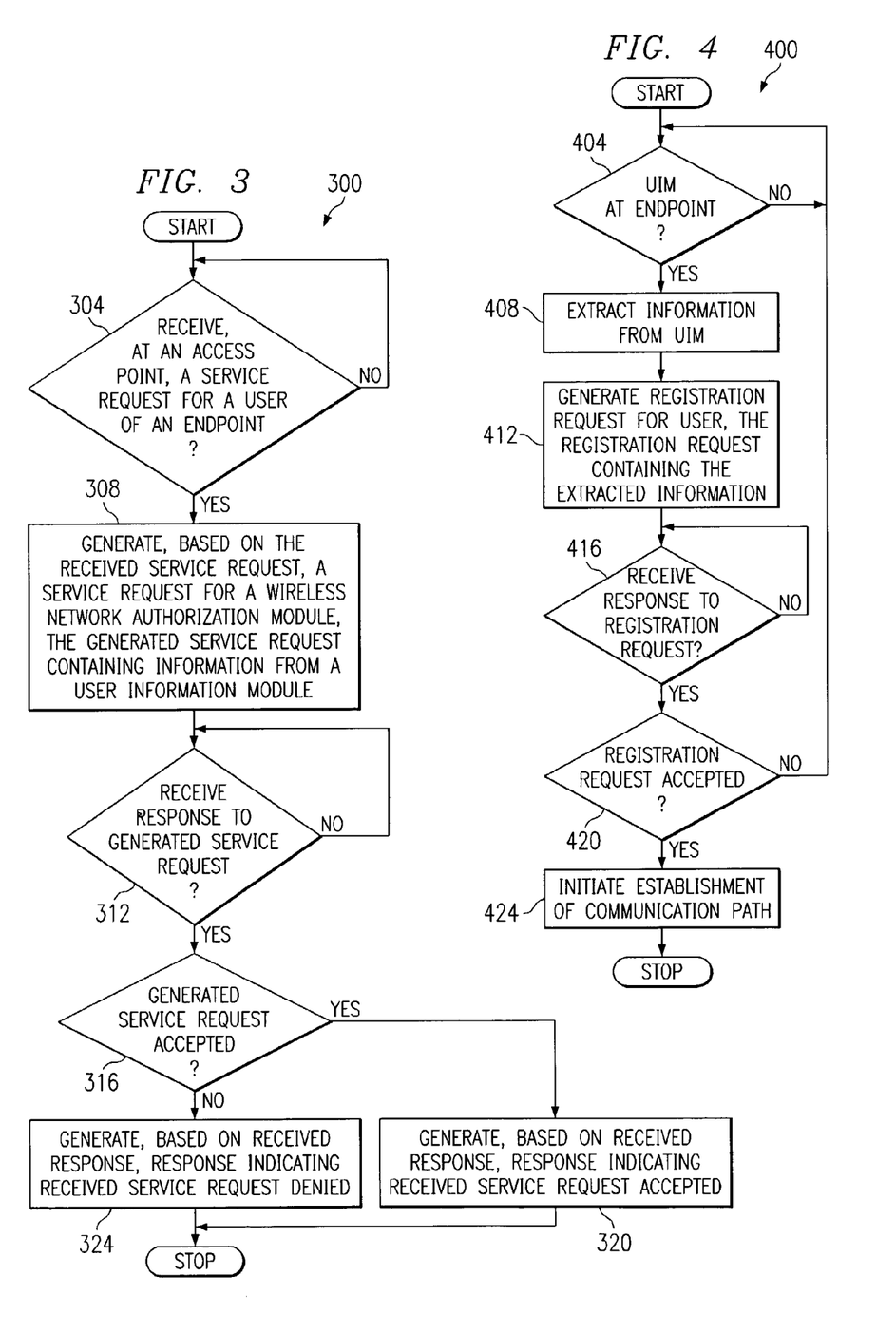
FIG. 3 is a flowchart illustrating a method for communication service portability in accordance with one embodiment of the present invention.
FIG. 4 is a flowchart illustrating a method for communication service portability in accordance with one embodiment of the present invention.

FIG. 3 is a flowchart illustrating a method for communication service portability in accordance with one embodiment of the present invention. The method begins with waiting to receive, at an access point, a service request for a user of an endpoint at decision block 304. The access point and the endpoint could be similar to access point 90 and endpoint 80a in FIG. 1, for example. The service request could be a SIP message, for example.

Upon receiving the service request, the method continues with generating, based on the received service request, a service request for a wireless network authorization module, the generated service request containing information from a user information module, at function block 308. The service request may be a RADIUS message, for example, and the wireless authorization module may be similar to AAA module 34 in FIG. 1. The generated service request may then be sent to the wireless authorization module.

At decision block 312, the method calls for waiting to receive a response to the generated service request. Upon receiving the response, which could be a RADIUS message, for example, the method calls for determining whether the generated service request was accepted at decision block 316. If the generated service request was accepted, the method calls for generating, based on the received response, a response indicating that the received service request was accepted at function block 320. The generated response may then be sent to the endpoint associated with the received service request. The generated response may be a SIP message, for example. The method is then at an end.

If, however, the service request was not accepted, the method calls for generating, based on the received response, a response indicating that the received service request was not accepted at function block 324. The generated response may then be sent to the endpoint associated with the received service request. The generated response may be a SIP message, for example. The method is then at an end.

Although flowchart 300 illustrates a method for communication service portability in accordance with one embodiment of the present invention, other embodiments may include less, more, and/or a different arrangement of operations. For example, the access point may need to request user information from the endpoint associated with the received service request. As another example, the access point may not determine whether the received response indicates that the generated service request was accepted. As an additional example, the access point may establish a session with an endpoint upon receiving a service request for the endpoint. As a further example, the access point may determine whether the endpoint associated with the service request is authorized to access the service based on information in the received service request. A variety of other examples exist.

FIG. 4 is a flowchart 400 illustrating a method for communication service portability in accordance with one embodiment of the present invention. The method begins at decision block 404 with waiting to detect a user information module (UIM) at an endpoint. The UIM may be similar to UIM 40 in FIG. 1, for example. The endpoint may be similar to endpoint 80a in FIG. 1, for example.

The method continues with extracting information from the UIM at function block 408 and generating a registration request for the user of the endpoint, the registration request containing extracted information, at function block 412. The registration request may be sent to an access point via an access client residing with the endpoint. The registration request may be a SIP message, for example.

At decision block 416, the method calls for waiting to receive a response to the registration request. When a response is received, the method calls for determining whether the registration request was accepted at decision block 420. If the registration request was accepted, the method calls for initiating the establishment of a communication path to an appropriate network at function block 424. The method is then at an end. If, however, the registration request was not accepted, the method calls for returning to decision block 404 to determine whether to attempt the registration process again.

Although flowchart 400 illustrates a method for communication service portability in accordance with one embodiment of the present invention, other embodiments may include less, more, and/or a different arrangement of operations. For example, the endpoint may generate the registration request without extracted information. As a further example, the endpoint may not extract information from the UIM until receiving a request to do so from an access point. As another example, the endpoint may establish a session with an access point before detection of the UIM. As an additional example, the access point may not initiate the establishment of a communication path. As another example, the endpoint may generate a message for a user and/or not attempt to register the endpoint again if the registration request is not accepted. A variety of other examples exist.

Figure 5:
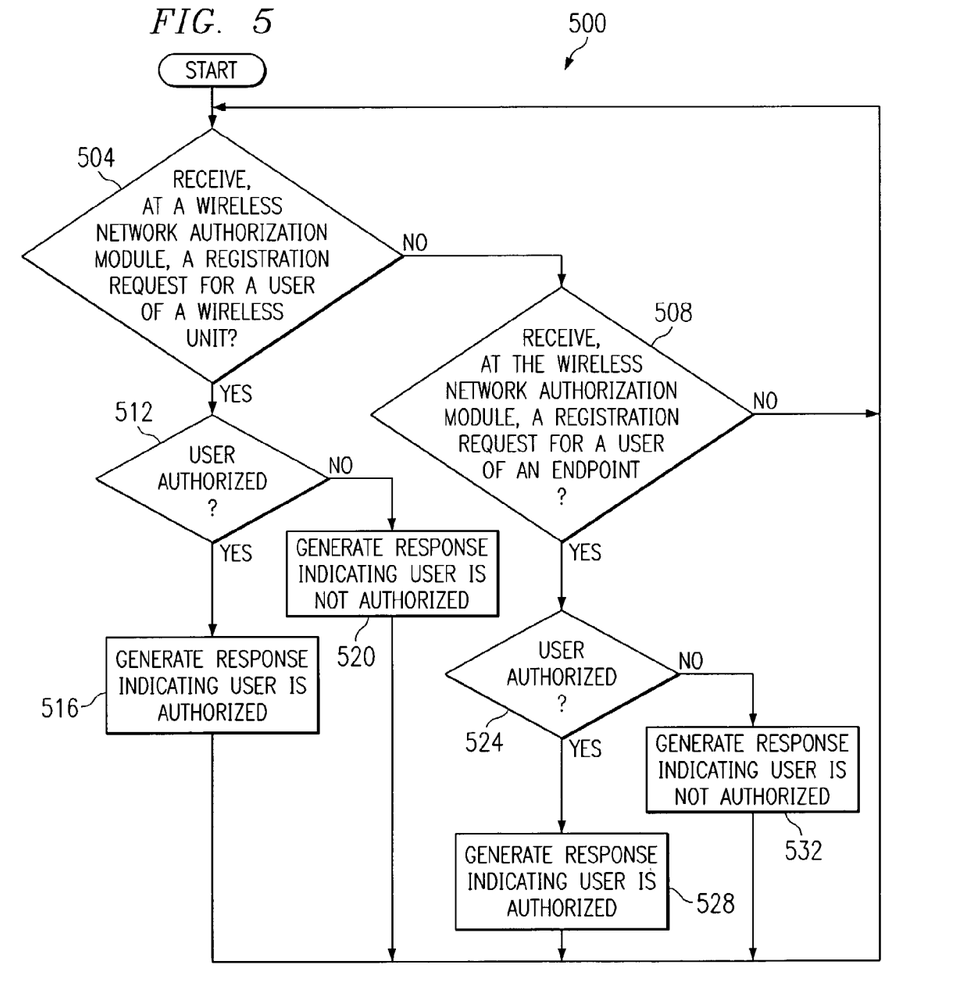
FIG. 5 is a flowchart illustrating a method for communication service portability in accordance with one embodiment of the present invention.

FIG. 5 is a flowchart 500 illustrating a method for communication service portability in accordance with one embodiment of the present invention. The method begins at decision block 504 with determining, at a wireless network authorization module, whether a registration request for a user of a wireless unit has been received. The wireless network authorization module may be similar to AAA module 34, and the wireless unit may be similar to wireless unit 38, for example. If such a registration request has not been received, the method calls for determining, at the wireless network authorization module, whether a registration request for a user of an endpoint has been received at decision block 508. The endpoint may be similar to endpoint 80a, and the registration request may be a RADIUS message, for example. If such a registration request has not been received, the method returns to decision block 504.

Once a registration request for a user of a wireless unit is received at the wireless network authorization module, the method calls for determining whether the user of the wireless unit is authorized at decision block 512. Determining whether the user of the wireless unit is authorized may be accomplished by comparing information from a user information module to a user profile, for example. If the user is authorized, the method calls for generating a response indicating that the user is authorized at function block 516. The response may be in the form of an acceptance of the registration request. The response may then be sent to the base station that sent the registration request. The method then returns to decision block 504. If, however, the user is not authorized, the method calls for generating a response indicating that the user is not authorized at function block 520. The response may be in the form of a denial of the registration request. The response may then be sent to the base station that sent the registration request. The method then returns to decision block 504.

Once a registration request for a user of an endpoint is received at the wireless network authorization module, the method calls for determining whether the user of the wireless unit is authorized at decision block 524. Determining whether the user of the endpoint is authorized may be accomplished by comparing information from a user information module to a user profile, for example. If the user is authorized, the method calls for generating a response indicating that the user is authorized at function block 528. The response may be in the form of an acceptance of the registration request. The response may then be sent to the access point that sent the registration request. The method then returns to decision block 504. If, however, the user is not authorized, the method calls for generating a response indicating that the user is not authorized at function block 532. The response may be in the form of a denial of the registration request. The response may then be sent to the access point that sent the registration request. The method then returns to decision block 504.

Although flowchart 500 illustrates a method for communication service portability in accordance with one embodiment of the present invention, other embodiments may include less, more, and/or a different arrangement of operations. For example, the wireless network authorization module may receive registration requests for users of other types of communication devices and determine whether their associated users are authorized. As an additional example, the wireless network authorization module may have to request user profile information from another component of the wireless network, such as for example, HLR 32, to determine whether a user is authorized. As a further example, the wireless network authorization module may check for and/or receive the registration requests in any order. As an additional example, the wireless network authorization module may receive a service request and determine whether the service request is authorized. A variety of other examples exist.

While a variety of embodiments have been discussed for the present invention, a variety of additions, deletions, modifications, and/or substitutions will be readily suggested to those skilled in the art. It is intended, therefore, that the following claims encompass such additions, deletions, modifications, and/or substitutions to the extent that they do not do violence to the spirit of the claims.

What is claimed is:

1. A method for communication service portability, comprising:
   receiving, at an access point, a registration request for a user of an endpoint;
   in response to receiving the registration request, generating, at the access point, a registration request for a wireless network authorization module, the generated registration request containing information from a user information module;
   receiving, at the access point, a response to the generated registration request;
   determining, at the access point, whether the generated registration request has been accepted; and
   generating, at the access point, a response to the received registration request based on the determined status of the received response.

2. The method of claim 1, wherein the received registration request is a Session Initiation Protocol message.

3. The method of claim 1, wherein the generated registration request is a Remote Authentication Dial-In User Service message.

4. The method of claim 1, wherein the access point comprises a call manager.

5. The method of claim 1, further comprising facilitating the establishment of a communication path for the endpoint associated with the received registration request if the received response indicates that the registration request was accepted.

6. The method of claim 5, wherein the communication path comprises the Internet.

7. The method of claim 1, further comprising:
   receiving, at the access point, a service request for a user of an endpoint;
   generating, based on the received service request, a service request for a wireless network authorization module, the generated service request containing information from a user information module;
   receiving a response to the generated service request; and
   determining whether the generated service request has been accepted.

8. The method of claim 7, wherein the requested service comprises a rationed service.

9. A system for communication service portability, comprising: an access point operable to:
   receive a registration request for a user of an endpoint,
   generate, based on the received registration request, a registration request for a wireless network authorization module, the generated registration request containing information from a user information module,
   receive a response to the generated registration request, determine whether the generated registration request has been accepted, and generate a response to the received registration request based on the status of the received response.

10. The system of claim 9, wherein the received registration request is a Session Initiation Protocol message.

11. The system of claim 9, wherein the generated registration request is a Remote Authentication Dial-In User Service message.

12. The system of claim 9, wherein the access point comprises a call manager.

13. The system of claim 9, wherein the access point is further operable to facilitate the establishment of a communication path for the endpoint associated with the received registration request if the received response indicates that the registration request was accepted.

14. The system of claim 13, wherein the communication path comprises the Internet.

15. The system of claim 9, wherein the access point is further operable to:
 receive a service request for a user of an endpoint;
 generate, based on the received service request, a service request for a wireless network authorization module, the generated service request containing information from a user information module;
 receive a response to the generated service request; and
 determine whether the generated service request has been accepted.

16. The system of claim 15, wherein the requested service comprises a rationed service.

17. A set of logic for communication service portability, the logic encoded in computer readable media and operable to:
 receive, at an access point, a registration request for a user of an endpoint;
 in response to receiving the registration request, generate, at the access point, a registration request for a wireless network authorization module, the generated registration request containing information from a user information module;
 receive, at the access point, a response to the generated registration request;
 determine whether the generated registration request has been accepted; and
 generate, at the access point, a response to the received registration request based on the determined status of the received response.

18. The logic of claim 17, wherein the logic is further operable to facilitate the establishment of a communication path for the endpoint associated with the received registration request if the received response indicates that the registration request was accepted.

19. The logic of claim 17, wherein the logic is further operable to:
 receive, at the access point, a service request for a user of an endpoint;
 generate, based on the received service request, a service request for a wireless network authorization module, the generated service request containing information from a user information module;
 receive a response to the generated service request; and
 determine whether the generated service request has been accepted.

20. The logic of claim 19, wherein the requested service comprises a rationed service.

21. The logic of claim 20, wherein the rationed service comprises a prepaid service.

22. A method for communication service portability, comprising:
 receiving, at an access point, a registration request for a user of an endpoint;
 in response to receiving the registration request, generating, at the access point, a Remote Access Dial-In User Access registration request for a wireless network authorization module, the generated registration request containing information from a user information module;
 receiving, at the wireless network authorization module, the generated registration request;
 determining whether the user of the endpoint is authorized;
 generating a response indicating whether the generated registration request is accepted, the acceptance of the registration request depending upon whether the user is authorized;
 receiving, at the access point, the response to the generated registration request;
 determining, at the access point, whether the generated registration request has been accepted;
 generating, at the access point, a response to the received registration request based on the determined status of the received response;
 receiving, at the wireless network authorization module, a registration request for a user of a wireless unit connected to a wireless network comprising at least one base station;
 determining whether the user of the wireless unit is authorized; and
 generating a response indicating whether the received registration request is accepted, the acceptance of the registration request depending upon whether the user is authorized.

23. The method of claim 22, further comprising:
 receiving, at the access point, a service request for a user of an endpoint;
 generating, based on the received service request, a service request for the wireless network authorization module, the generated service request containing information from a user information module;
 receiving, at the wireless network authorization module, the generated service request;
 determining whether the user of the endpoint is authorized to access the service;
 generating a response indicating whether the generated service is accepted, the acceptance of the service request depending upon whether the user is authorized to access the service;
 receiving, at the access point, the response to the generated service request; and
 determining whether the generated service request has been accepted.

24. The method of claim 22, wherein:
 determining whether the user of the wireless unit is authorized comprises comparing information from a user information module to a user profile; and
 determining whether the user of the endpoint is authorized comprises comparing information from a user information module to a user profile.

25. The method of claim 24, wherein the user information for the wireless unit and the user information for the endpoint originate from the same user information module.

* * * * *